United States Patent [19]
Wilder et al.

[11] 3,753,686
[45] Aug. 21, 1973

[54] RECOVERY OF COPPER, NICKEL, COBALT AND MOLYBDENUM FROM COMPLEX ORES

[75] Inventors: Thomas C. Wilder, Cambridge; John J. Andreola, Reading, both of Mass.

[73] Assignee: Kennecott Copper Corporation, New York, N.Y.

[22] Filed: July 16, 1970

[21] Appl. No.: 55,608

[52] U.S. Cl............................ 75/21, 75/103, 75/117, 75/119, 75/121
[51] Int. Cl...... C21b 1/02, C22b 3/00, C22b 15/18
[58] Field of Search .................... 75/7, 21, 103, 117

[56] References Cited
UNITED STATES PATENTS

| | | | |
|---|---|---|---|
| 2,759,809 | 8/1956 | Aimone | 75/7 |
| 3,088,820 | 5/1963 | Mackiw | 75/7 |
| 2,074,013 | 3/1937 | Bradley | 75/103 |
| 3,450,523 | 6/1969 | Socolescu | 75/7 |
| 3,471,285 | 10/1969 | Rolf | 75/103 |
| 3,146,091 | 9/1964 | Green | 75/7 |
| 2,345,067 | 4/1944 | Osann | 75/7 |
| 2,363,315 | 11/1944 | Grothe | 75/103 |
| 2,822,261 | 2/1958 | Mackiw | 75/103 |
| 3,169,856 | 2/1965 | Mero | 75/117 |
| 2,663,618 | 12/1953 | Babbitt | 75/103 |

*Primary Examiner*—L. Dewayne Rutledge
*Assistant Examiner*—Peter D. Rosenberg
*Attorney*—John L. Sniado and Lowell H. McCarter

[57] ABSTRACT

Copper, nickel, cobalt and molybdenum may be leached from complex ores containing manganese, iron, copper, nickel, molybdenum, and cobalt after the complex ore is roasted with a carbon containing material.

8 Claims, No Drawings

RECOVERY OF COPPER, NICKEL, COBALT AND MOLYBDENUM FROM COMPLEX ORES

BACKGROUND OF THE INVENTION

With the quantity of the world's reserves of copper, nickel, cobalt and molybdenum rapidly diminishing the metallurgical industry is continually looking for better ways of increasing the recovery of present mineral sources and is vigilant in attempting to develop economically attractive processes to recover metal values from ores believed to be of little economic value. Pelagic sedimentary materials containing significant quantities of metal values have been known since late in the nineteenth century, however, no attempts have been made to recover the metal values therefrom. These pelagic sedimentary materials are considered to be complex ores which do not lend themselves to currently known extractive metallurgical processing techniques. Up to the present time these complex ores have only been found on the deep-sea floor of the oceans and lakes. Terrestrial ore beds containing manganese, iron, copper, nickel, molybdenum, cobalt and other metal values where the ore has physical characterization similar to ocean floor ores have not as yet been discovered. However it is not unlikely that the same or similar type of complex ores will be located as terrestrial deposits. For the purpose of the remainder of this patent specification these complex ores will be variously referred to as deep sea nodules, deep sea manganese nodules, manganese nodules or nodules.

Ocean floor deposits are found as nodules, loose-lying at the surface of the soft sea floor sediment, as grains in the sea floor sediments, as crusts on ocean floor hard rock outcrops, as replacement fillings in calcareous debris and animal remains, and in other less important forms. Samples of this ore material can readily be recovered on the ocean floor by drag dredging, a method used by oceanographers for many years, or by deep sea hydraulic dredging, a method that could be used in commercial operations to mine these deposits. Mechanical deep sea nodule harvesters are described in U.S. Pat. Nos. 3,480,326 and 3,504,943.

The nodules invariably show an onionskin or concentric layer structure and are frequently oolitic within individual layers. However the nodules have no overall crystalline structure. The literature tells us that the nodules consist of a number of intimately and randomly intergrown crystallites of many minerals among which are barite, rutile, anatase, goethite, and several apparently new minerals of manganese. Attempts have been made to characterize these new manganese minerals by x-ray diffraction, electron diffraction and electron probe investigation without much success. Copper and nickel ore are not present in the nodule in the usual form found in terrestrial ores. It has been postulated that copper and nickel are present in the nodule as a result of a substitution mechanism. It has not been possible, therefore, to determine the best method of extracting the mineral values from the deep sea manganese nodules, particularly copper, nickel, cobalt and molybdenum.

The character and chemical content of the deep sea nodules may vary widely depending upon the region from which the nodules are obtained. For a detailed chemical analysis of nodules from the Pacific Ocean see pages 449 and 450 in The Encyclopedia of Oceanography, edited by R. W. Fairbridge, Reinhold Publishing Corp., N.Y., 1966, and U.S. Pat. No. 3,169,856. For the purpose of this invention the complex ores will be considered as containing the following approximate metal content range on a dry basis.

METAL CONTENT ANALYSIS RANGE

| | |
|---|---|
| Copper | 0.8–1.8% |
| Nickel | 1.0–2.0% |
| Cobalt | 0.1–0.5% |
| Molybdenum | 0.03–0.1% |
| Manganese | 10.0–40.0% |
| Iron | 4.0–25.0% |

The remainder of the ore consists of clay minerals with lesser amounts of quartz, apatite, biotite and sodium and potassium feldspars. Of the many ingredients making up the manganese nodules, copper and nickel are emphasized because, from an economic standpoint, they are the most significant metals in most of the ocean floor ores. Cobalt and molybdenum may also be recovered by the process of this invention.

The mining of the vast reserves of manganese deep sea nodules lying over the ocean floor, can best be economically justified, were a more economical process available to effect separation and ultimate recovery of the copper and nickel elements. The recovery of molybdenum and cobalt from these complex ores is also of economic interest.

Accordingly, among the objects of this invention are to provide a novel and improved process for extracting the copper and nickel from the complex ores or manganese deep sea nodules. Another object is to provide a novel and improved process for extracting copper and nickel which process shall be simple and straightforward. Another object is to provide a novel and improved process for extracting copper and nickel as found in manganese deep sea nodules, which process, at the same time facilitates the recovery of the cobalt and molybdenum elements contained in the nodules.

SUMMARY

When complex ores containing manganese, iron, copper, nickel, molybdenum, cobalt, such as the manganese nodules, are heated with a high carbon content material, such as coal, coke, charcoal and selected petroleum products, such as crankcase oils, bunker C fuel oil, pitch and petroleum coke, almost all of the copper and nickel may be leached out by an ammonium salt in ammonium hydroxide. It has been discovered that economic recovery of copper, nickel, cobalt and molybdenum is accomplished when the complex ore is roasted with a carbon containing material.

The process of this invention comprises roasting a complex ore containing manganese, iron, copper, nickel, molybdenum and cobalt admixed with a carbonaceous material whose carbon content is from about 3 to about 10 percent by weight of the complex ore, leaching the roasted complex ore with a solution of an ammonium salt in ammonium hydroxide whereby substantially all of the copper, nickel, cobalt and molybdenum are removed from the complex ore without leaching the manganese and iron from the complex ore. The copper, nickel, cobalt and molybdenum values may then be recovered from the leachate by any of the known methods.

DESCRIPTION OF PREFERRED EMBODIMENTS

Mineral characterization studies have shown that essentially all manganese in the complex ore is in the tetravalent state, and that iron is in the trivalent state. It therefore can be assumed that all metals of interest in the complex ore are in their highest naturally occurring valence states. It can also be assumed that these metals are associated with oxygen in oxides, mixed oxides, or more likely in highly complex substituted compounds, the nature of which has not been determined.

Nevertheless, for the purposes of extraction, the ore may be considered to be made up of manganese dioxide, ferric oxide, cobaltic oxide, molybdic oxide, nickel oxide and cupric oxide with minor amounts of other oxides and varying amounts of clay. Ideally, it would be desirable to find a set of reducing conditions which would render the valuable nickel, copper, cobalt and molybdenum leachable in, say, ammoniacal solution while at the same time not forming soluble species of iron and manganese. However, a brief exercise in the thermodynamics of reduction of a mixture of the aforementioned oxides by any reducing agent would show that the stated selective reduction would be clearly impossible. This is especially true in view of the fact that ferrous oxide (FeO) and manganous oxide (MnO) are leachable in ammoniacal solution.

When sufficient carbonaceous material is used in the roast to effect satisfactory recoveries of the four valuable metals, a significant amount of iron and manganese is also of a leachable form. However, dissolved iron and manganese in ammoniacal solution, when exposed to air, are oxidized to form insoluble precipitates. Very little of the valuable metals in the solution are co-precipitated. It has been shown in the laboratory that the roasted calcine, when leached in the absence of air, will have an appreciable portion of its iron and manganese dissolved. When the same leach solution plus calcine mixture is then exposed to air the metallic portion (e.g., copper, nickel, etc.) will dissolve while at the same time iron and manganese immediately precipitate out with little effect on the extractions of the valuable metals.

The carbonaceous materials that may be used within the scope of this invention include carbon, charcoal, coal, coke, crankcase oil, bunker C fuel oil, pitch, petroleum coke and cellulose. The preferred materials for economic reasons are anthracite coal, bituminous coal, bunker C fuel oil and coke such as that produced by the destructive distillation of coal, and usually containing from about 90-95 percent fixed or solid carbon.

In the preferred embodiment of this invention the complex ore as exemplified by deep sea nodules are ground and mixed with a carbon containing material. The mixture is then roasted in a kiln, oven or furnace to a temperature of from about 350° C, preferably about 650° C, up to the sintering temperature of the mixture.

The amount of carbonaceous material mixed with the deep sea nodules is critical when a high recovery of copper and nickel is required. It has been found that economic recovery of copper and nickel can be obtained when the nodules are reacted with a carbonaceous material whose carbon content is from about 3.0 to about 10 percent by weight of the nodules. Optimum recovery of copper and molybdenum is obtained when the nodules are roasted with a carbonaceous material whose carbon content is about 3 percent by weight of the nodules. Cobalt and nickel recovery are maximum when using a carbonaceous material whose carbon content is about 6 percent by weight of the manganese nodules. Larger quantities of carbonaceous material can be used but actually may be detrimental to recovery of copper and molybdenum. Thus although any quantity of carbonaceous material containing over 3 percent carbon based on the weight of the nodules may be used within the broad scope of the invention it is clear that the preferred range of carbon in the carbonaceous material, for economic considerations, is from about 3 to about 10 percent by weight of the nodules.

The carbonaceous material-deep sea nodules mixture is allowed to remain at the selected reaction temperature of from about 650° C, to preferably about 800° C, for at least 15 minutes. The reaction product is then leached with a solution of an ammonium salt in ammonium hydroxide. With proper conditions extractions of over 80 percent of the copper and nickel in the deep sea nodules can be obtained. Economic recoveries of cobalt and molybdenum can also be made. Almost all of the manganese and iron remain in the residue and therefore does not interfere with the recovery of the nickel, copper, cobalt and molybdenum from the ammoniacal solution.

The nodules may be dried to remove the uncombined water before they are mixed with the carbon containing material. If the nodules are not predried an additional quantity of carbon containing material should be included to accomplish the removal of the uncombined water.

The ammonium salt in ammonium hydroxide leach solutions may be for example ammonium chloride ($NH_4Cl$) in aqueous ammonia ($NH_3$) or ammonium carbonate [ $(NH_4)_2CO_3$] in aqueous ammonia. Preferred concentrations for economic considerations are from at least about 0.2 molar ammonium salt in from at least about 2.0 percent aqueous ammonia. However it is clear that higher concentrations can be used without departing from the invention.

Nickel, copper, cobalt and molybdenum in the leach solution or leachate may be recovered by any of the known methods such as precipitation followed by filtration, electrowinning, cementation, hydrogen reduction, ion exchange or membrane separation techniques.

EXAMPLE I

Dried manganese deep sea nodules having valuable constituent analysis of about: Nickel – 1.75 percent, Copper 1.39 percent, Cobalt – 0.33 percent and Molybdenum – 0.08 percent were ground to minus 60 mesh and roasted with from 3 to 6 percent by weight of anthracite coal having from about 86–98 percent carbon at 800° C for approximately 30 minutes.

A. A first batch of calcined or roasted nodules were then leached with a 1 molar $(NH_4)_2CO_3$ in 10 percent aqueous ammonia solution for about 4 hours, the first 2 hours in the absence of air, the second 2 hours in the presence of air at a temperature of 80° C. Extractions are shown below.

| Percent Coal in the roast | Percentage Extractions | | | |
| --- | --- | --- | --- | --- |
| | Ni | Cu | Co | Mo |
| 3 | 12.8 | 94.9 | — | — |
| 4 | 52.5 | 98.9 | 26.0 | 80.0 |
| 5 | 86.4 | 89.5 | 58.7 | 80.0 |
| 6 | 91.4 | 82.6 | 82.0 | 89.3 |

B. A second batch of calcined nodules were also leached with the same leach solution for four hours in the presence of air at room temperature (23° C). Extractions are shown below.

| Percent Coal in the roast | Percentage Extractions | | | |
|---|---|---|---|---|
| | Ni | Cu | Co | Mo |
| 3 | 16.0 | 98.5 | 5.7 | 88.1 |
| 4 | 51.6 | 97.9 | 25.8 | 86.1 |
| 5 | 86.2 | 88.5 | 47.4 | 94.9 |
| 6 | 90.4 | 84.7 | 84.8 | 90.0 |

In the leach solutions from the roast with 6 percent coal, both the manganese and the iron concentrations were less than one-twentieth of the nickel or copper, indicating that the reagent consumption is very low and that less than 0.3 percent of the Mn and 1 percent of the Fe is soluble in the leach solution.

EXAMPLE II

Manganese nodules were mixed with anthracite coal and roasted at about 800° C in a nitrogen atmosphere for about 30 minutes. The nodules after roasting had a valuable constituent content of approximately 1.95 percent nickel, 1.68 percent copper, 0.21 percent cobalt and 0.09 percent molybdenum. The roasted nodules were leached at 80° C for 1 hour in the absence of air and then for 3 hours in air with a 1 molar $(NH_4)_2CO_3$ in 10 percent aqueous ammonia leach solution. Extractions were Manganese nodules having valuable constituent content as set out in Example I were roasted with anthracite coal at 650° C in a nitrogen atmosphere for about 2 ½ hours. A leach solution consisting of 1 molar $(NH_4)_2CO_3$ in 10 percent aqueous ammonia was used to leach the roasted nodules 1 hour in the absence of air at 80° C and then 3 hours in air at room temperature. Extractions were

EXAMPLE IV

Deep sea nodules were ground to a minus 60 mesh and mixed with 7 percent by weight bituminous coal. The coal and nodule mixture was roasted at about 800° C for one-half hour. After the roasted nodules cooled, the calcine was leached for 4 hours, using a $1M(NH_4)_2CO_3$ in 10 percent aqueous ammonia solution, in air at room temperature. Extractions were 92.3 percent copper, 88.2 percent nickel, 71.1 percent cobalt.

A quantity of calcined nodules from the same roast were leached for 8 hours. The first 4 hours of the leach was in the absence of air, and the second 4 hour leach was in the presence of air with fresh leach solution being introduced at several time intervals. Extractions were 93.1 percent copper, 90.2 percent nickel, 78.7 percent cobalt.

EXAMPLE V

Manganese nodules were ground to a minus 60 mesh, dried and mixed with 7 percent by weight of anthracite coal. The mixture was then roasted at 800° C for one-half hour. The calcine was allowed to cool in the roast vessel under a nitrogen atmosphere. A leach solution of 1 molar $(NH_4)_2CO_3$ in 10 percent aqueous ammonia was introduced into the roast vessel in such a way that air did not contact the calcine before the solution did. The leach solution plus the calcine was transferred to a flask and leached for 4 hours at room temperature. The first 2 hours of the leach time was in the absence of air. Extractions were 94.0 percent nickel, 92.7 percent copper and 72.9 percent cobalt.

A second quantity of calcined nodules from the same roast were exposed to air for about 30 minutes before being leached with the same leach solution. The extractions were, 85.2 percent nickel, 80.5 percent copper and 77.1 percent cobalt.

Thus it is seen that there is a slight extraction advantage by avoiding the exposure of roasted nodules to the air prior to leaching.

EXAMPLE VI

Manganese nodules were ground to a minus 60 mesh and dried. Twenty grams of these dried nodules were slurried with a solution of 2 grams of methyl cellulose in 20 ml of water. The slurry was allowed to stand at 70° C until essentially all of the water had evaporated. The dried slurry was then roasted at 800° C for about one-half hour. Leach solution, 1 molar $(NH_4)_2CO_3$ + 10 percent $NH_3$, was introduced into roasting vessel so as to exclude air contact with the roasted nodules before the leaching commenced. The mixture was leached for 4 hours at room temperature, the first 2 hours in the absence of air. Extractions were 94.9 percent nickel, 95.6 percent copper, and 81.7 percent cobalt. Thus it is seen that any carbonaceous material may be used to provide the carbon for roasting the deep sea manganese nodules.

EXAMPLE VII

Manganese nodules were ground to a minus 60 mesh and dried. The ground nodules were then mixed with a 90 weight crankcase oil. The amount of crankcase oil was 7 percent by weight of the nodules. The oil-nodule mixture was then roasted for about one-half hour at 800° C in a nitrogen atmosphere. After cooling the roasted nodules were leached with a 1 molar ammonium carbonate in 10 percent ammonia aqueous solution.

| Leach Conditions | Percentage Extraction | | |
|---|---|---|---|
| | Cu | Ni | Co |
| A. 2 hours in the absence of air followed by 2 hours in the presence of air at room temperature. | 92.9 | 90.7 | 85.5 |
| B. 4 hours at room temperature in the presence of air. | 95.6 | 92.2 | 79.8 |

EXAMPLE VIII

Manganese nodules were ground to a minus 60 mesh and mixed with 7 percent by weight of the nodules of crude oil and roasted under a nitrogen atmosphere for about one-half hour. The temperatures of roasting were between 350° C and 1,050° C as shown in the tabulation below. After the nodules had cooled the powdered reduced calcines were leached for 2 hours in the absence of air and then 2 hours with aeration. The aqueous leach solution contained 1 molar ammonium carbonate and 10 percent ammonia. Extractions are shown in the tabulation below.

| Temperature of Roast °C | Percentage Extraction | | |
|---|---|---|---|
| | Cu | Ni | Co |
| 350 | 81.6 | 46.6 | 27.8 |
| 445 | 98.6 | 67.2 | 31.0 |
| 505 | 97.1 | 53.5 | 20.1 |
| 610 | 96.6 | 87.1 | 41.8 |
| 685 | 96.5 | 91.7 | 45.0 |
| 800 | 88.1 | 91.8 | 82.4 |
| 1050 | 31.7 | 39.2 | 42.6 |

Dried manganese nodules after being ground to a minus 60 mesh were mixed with 30 percent by weight of the nodules of crude oil. The mixture was heated under a nitrogen atmosphere to 800° C for about one-half hour. After cooling to room temperature the reduced nodules were then leached with a 1 molar ammonium carbonate solution in a 10 percent ammonia aqueous leach solution. Extractions were 94.4 percent copper, 97.0 percent nickel and 80.5 percent cobalt.

EXAMPLE X

Dried and ground manganese nodules were mixed with 7 percent by weight of the nodules with bunker C fuel oil (the lowest volatile fraction of petroleum, also known as number 6 fuel oil) and heated under a nitrogen atmosphere to temperatures in the range of from about 425° C to about 900° C for one-half hour. After cooling, the reaction mixtures were leached with a 1 molar ammonium carbonate 10 percent aqueous ammonia leach solution for about 2 hours without air and for about 2 hours with aeration of the leaching solution. Percentage extractions are shown in the tabulation below.

| Temperature of Roast °C | Percentage Extraction | | |
|---|---|---|---|
| | Cu | Ni | Co |
| 425 | 97.4 | 68.9 | 33.3 |
| 503 | 97.4 | 71.1 | 32.0 |
| 545 | 96.2 | 44.9 | 14.5 |
| 600 | 96.4 | 90.7 | 49.0 |
| 650 | 97.1 | 96.3 | 70.8 |
| 705 | 96.7 | 96.9 | 78.7 |
| 800 | 94.5 | 96.2 | 85.3 |
| 900 | 82.0 | 27.1 | 12.7 |

A second group of powdered reduced nodules, roasted as described, were leached for 4 hours with aeration using an aqueous leach solution of 1 molar ammonium carbonate and 10 percent ammonia at room temperature. Percentage extractions are tabulated below.

| Temperature of Roast °C | Percentage Extraction | | |
|---|---|---|---|
| | Cu | Ni | Co |
| 425 | 95.1 | 53.8 | 28.4 |
| 503 | 97.3 | 45.8 | 22.4 |
| 545 | 95.4 | 67.8 | 20.2 |
| 600 | 97.3 | 80.3 | 28.9 |
| 650 | 97.5 | 95.9 | 61.7 |
| 705 | 98.0 | 95.8 | 71.4 |
| 800 | 96.4 | 95.4 | 75.8 |
| 900 | 79.8 | 19.4 | 8.0 |

EXAMPLE XI

Manganese nodules dried and ground to a minus 60 mesh were mixed with 4 percent by weight of the nodules of bunker C fuel oil (number 6 fuel oil) and heated under a nitrogen atmosphere for about one-half hour to 700 or 800° C in separate roasts. The cooled reaction mixture was then leached for 2 hours in the absence of air and then for 2 hours with aeration with a 1 molar ammonium carbonate 10 percent aqueous ammonia leach solution. The extractions are tabulated below.

| Temperature of Roast °C | Percentage Extraction | | |
|---|---|---|---|
| | Cu | Ni | Co |
| 700 | 94.9 | 88.1 | 40.4 |
| 800 | 94.6 | 93.6 | 76.0 |

A second group of calcines, roasted as described, were leached for a period of 4 hours with aeration in a 1 molar ammonium carbonate 10 percent aqueous ammonia solution at room temperature. Extractions are shown below.

| Temperature of Roast °C | Percentage Extraction | | |
|---|---|---|---|
| | Cu | Ni | Co |
| 700 | 95.4 | 85.0 | 29.9 |
| 800 | 95.8 | 91.5 | 67.1 |

EXAMPLE XII

Dried manganese nodules were crushed to ten size fractions ranging from minus one-fourth inch plus 4 mesh to a minus 115 mesh. Each of the 10 size fractions was mixed together with about 7 percent by weight of the nodules of bunker C fuel oil and heated up to 800° C under a nitrogen atmosphere. After the roasted nodules had cooled the product was screened and a 5 gram portion from each of the 10 size fractions was leached with 100 ml of a leach solution containing 1 molar ammonium carbonate and 10 percent aqueous ammonia for 2 hours in the absence of air followed by 2 hours of leaching with aeration. The percentage extractions as tabulated below indicate that the size of the nodules being reduced are not necessarily critical to the amount of extraction of the valuable metals in the nodules.

| Size Fraction | Percentage Extraction | | |
|---|---|---|---|
| | Cu | Ni | Co |
| −¼" + 4 mesh | 89.1 | 91.7 | 80.7 |
| −4 + 6 mesh | 76.8 | 88.1 | 70.3 |
| −6 + 8 mesh | 72.8 | 88.0 | 71.8 |
| −8 + 10 mesh | 65.6 | 89.4 | 71.7 |
| −10 +14 mesh | 90.4 | 91.5 | 81.4 |
| −14 + 20 mesh | 89.6 | 91.0 | 79.2 |
| −20 + 32 mesh | 84.4 | 90.3 | 76.7 |
| −32 + 60 mesh | 86.4 | 90.6 | 77.9 |
| −60 + 115 mesh | 83.2 | 89.0 | 76.9 |
| −115 mesh | 78.9 | 93.3 | 77.8 |

We claim:

1. The process of extracting a metal selected from copper, nickel, cobalt, molybdenum and mixtures thereof from manganese deep sea nodules wherein iron, copper, nickel, cobalt and molybdenum is present in said nodules as oxides or mixed oxides and said manganese is present as manganese dioxide consisting of the steps of
   1. reducing the nodules to a particle size no larger than about one-fourth inch in diameter,
   2. roasting said nodules admixed with a material selected from the group consisting of liquid and solid carbonaceous material said carbonaceous material having a carbon content of from about 3 to about 10 percent by weight of said nodules at a temperature of from about 350° C to about 1,000° C for at least 15 minutes whereby said manganese dioxide is reduced to at least manganic oxide thereby rendering said copper, nickel, cobalt and nickel soluble,
   3. leaching at atmospheric pressure said roasted nodules with an aqueous leach solution containing at least 2 percent ammonia and at least a 0.2 molar concentration of an ammonium salt selected from ammonium chloride, ammonium carbonate and ammonium sulfate whereby a leachate rich in a metal selected from copper, nickel, cobalt, molybdenum and mixtures thereof and essentially free of manganese and iron is obtained,
   4. separating said leachate from nodule residue, and
   5. recovering a metal selected from copper, nickel, cobalt, molybdenum and mixtures thereof from said leachate.

2. The process of claim 1 wherein said roasted nodules are leached in the aqueous solution sequentially first out of contact with air and then further leached in the aqueous solution in the presence of air.

3. The process of claim 1 wherein the carbon containing material is selected from anthracite coal, bituminous coal, methyl cellulose, crankcase oil, crude oil, bunker C fuel oil, and the destructive distillation products of anthracite coal and bituminous coal.

4. The process of claim 1 wherein the aqueous leach solution contains about 10 percent ammonia and 1 molar ammonium carbonate.

5. The process of extracting copper and nickel from manganese deep sea nodules wherein iron, copper and nickel is present in said nodules as oxides or mixed oxides and manganese is present as manganese dioxide consisting of the steps of
1. reducing nodules to a particle size no larger than about one-fourth inch in diameter,
2. roasting said nodules admixed with a material selected from the group consisting of liquid and solid carbonaceous material said carbonaceous material having a carbon content of from about 3 to about 10 percent by weight of said nodules at a temperature of from about 350° C to about 1,000° C for at least 15 minutes whereby said manganese dioxide is reduced to at least manganic oxide thereby rendering said copper and nickel soluble,
3. leaching said roasted nodules with an aqueous leach solution containing at least 2 percent ammonia and at least a 0.2 molar concentration of an ammonium salt selected from ammonium chloride, ammonium carbonate and ammonium sulfate at atmospheric pressure whereby a leachate rich in copper and nickel, and essentially free of manganese and iron is obtained,
4. separating said leachate from nodule residue, and
5. recovering copper and nickel from said leachate.

6. The process of claim 5 wherein the carbonaceous material is selected from coal, coke, crude oil, bunker C fuel oil and mixtures thereof.

7. The process of claim 5 wherein the aqueous ammonia-ammonium salt leach contacts the reduced manganese nodules before the reduced manganese nodules come into contact with air.

8. The process of claim 5 wherein the aqueous leach solution contains about 10 percent ammonia and 1 molar ammonium carbonate.

| Percent Coal in the roast | | Percentage Extraction | | |
|---|---|---|---|---|
| | Ni | Cu | Co | Mo |
| 4 | 53.3 | 98.8 | 26.0 | 83.6 |
| 5 | 87.1 | 84.1 | 55.8 | 94.0 |
| 6 | 91.7 | 83.9 | 60.9 | 90.0 |
| 8 | 86.9 | 87.6 | 67.7 | — |

EXAMPLE III

| Percent Coal in the roast | Ni | Cu | Co | Mo |
|---|---|---|---|---|
| 6 | 47.3 | 98.2 | 29.8 | 82.3 |
| 10 | 79.2 | 90.2 | 50.0 | 84.1 |

* * * * *

UNITED STATES PATENT OFFICE
CERTIFICATE OF CORRECTION

Patent No. 3,753,686            Dated August 21, 1973

Inventor(s) Thomas C. Wilder et al.

It is certified that error appears in the above-identified patent and that said Letters Patent are hereby corrected as shown below:

Column 5, insert between lines 27 and 28 the following:

| Percent Coal in the roast | Ni | Percentage Cu | Extraction Co | Mo |
|---|---|---|---|---|
| 4 | 53.3 | 98.8 | 26.0 | 83.6 |
| 5 | 87.1 | 84.1 | 55.8 | 94.0 |
| 6 | 91.7 | 83.9 | 60.9 | 90.0 |
| 8 | 86.9 | 87.6 | 67.7 | -- |

Example III

Column 5, insert between lines 35 and 36 the following:

| Percent Coal in the roast | Ni | Cu | Co | Mo |
|---|---|---|---|---|
| 6 | 47.3 | 98.2 | 29.8 | 82.3 |
| 10 | 79.2 | 90.2 | 50.0 | 84.1 |

Column 7, line 1, insert -- Example IX

Column 10, delete lines 18 through 29.

Signed and sealed this 19th day of March 1974.

(SEAL)
Attest:

EDWARD M. FLETCHER, JR.
Attesting Officer

C. MARSHALL DANN
Commissioner of Patents